United States Patent [19]

Granberg et al.

[11] Patent Number: 4,709,833
[45] Date of Patent: Dec. 1, 1987

[54] ROTATIONALLY MOLDED SALVAGE DRUM AND RECESSED LID

[75] Inventors: William J. Granberg, Mansfield; Richard A. Wagner; Gary W. Hundt, both of Fort Worth, all of Tex.

[73] Assignee: Essex Environmental Industries, Inc., Hurst, Tex.

[21] Appl. No.: 17,068

[22] Filed: Feb. 20, 1987

[51] Int. Cl.⁴ ............................................. B65D 45/32
[52] U.S. Cl. .................................... 220/319; 220/72; 220/74
[58] Field of Search ........................... 220/72, 74, 319

[56] References Cited

U.S. PATENT DOCUMENTS

| | | | |
|---|---|---|---|
| 2,727,673 | 12/1955 | Bergstrom | 220/319 |
| 3,434,625 | 3/1969 | Embry, Jr. | 220/72 |
| 3,696,962 | 10/1972 | Fehres et al. | 220/72 |
| 4,648,522 | 3/1987 | Wise | 220/74 |

Primary Examiner—George T. Hall
Attorney, Agent, or Firm—Thomas E. Spath

[57] ABSTRACT

An improved rotationally molded salvage drum and double-walled reinforced recessed lid is sealed and secured with a conventional ring clamp, and is provided with vertical column ribs projecting outward from generally cylindrical sidewalls; in a preferred embodiment the diameter of the lower section is smaller than that of the upper section to permit nesting of the empty stacked drums.

18 Claims, 10 Drawing Figures

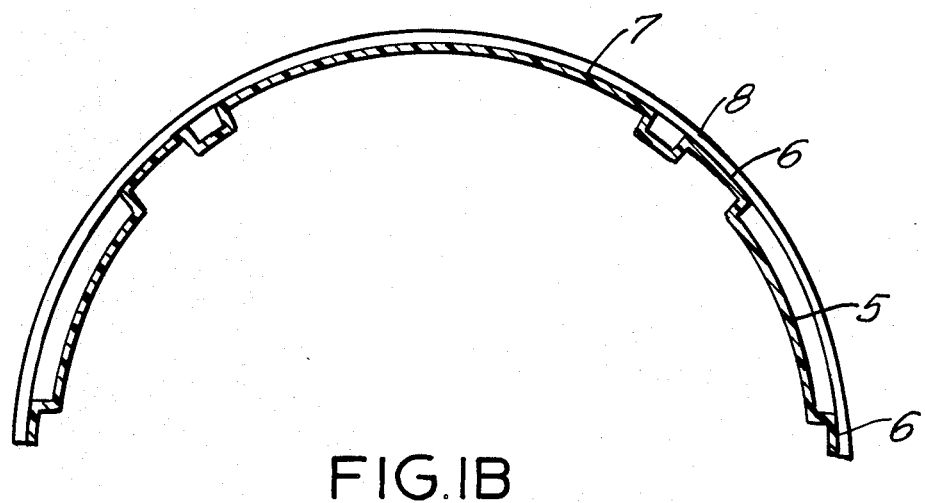
FIG.1B
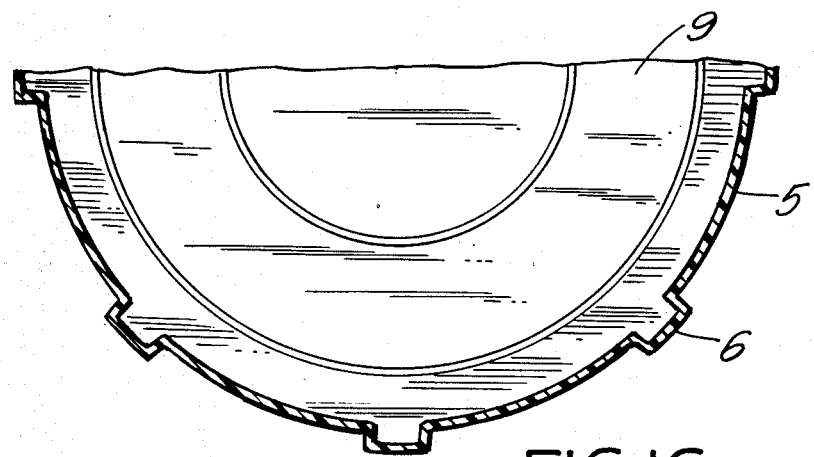
FIG.1C
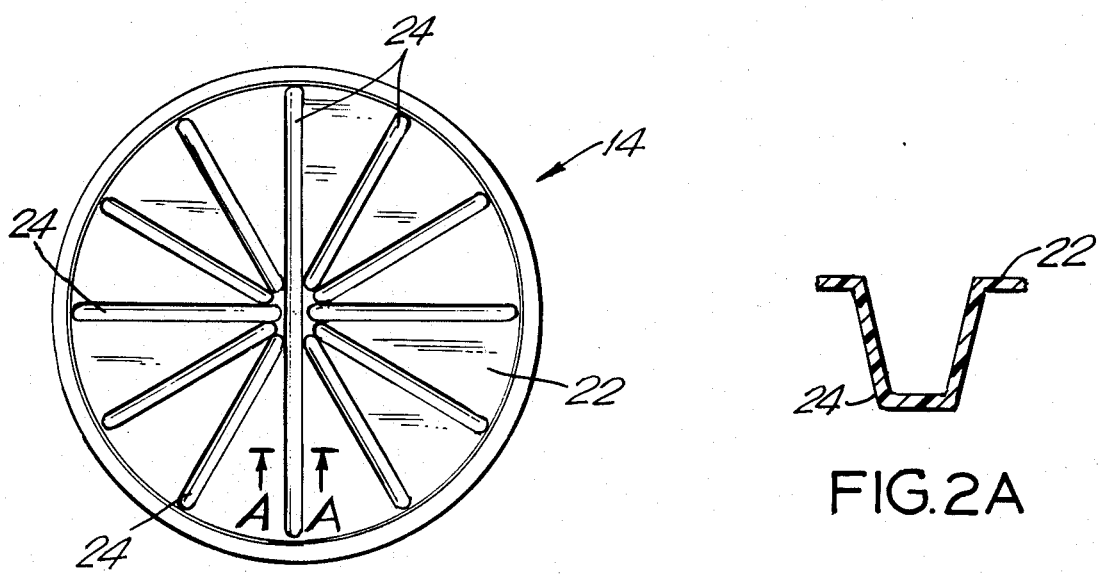
FIG.2
FIG.2A

ROTATIONALLY MOLDED SALVAGE DRUM AND RECESSED LID

BACKGROUND OF THE INVENTION

1. Field of the Invention

The present invention is related to salvage drums, or over-pack containers, that are adapted to receive industrial chemical drums. These over-pack containers are used to transport and store leaking and otherwise damaged drums containing toxic materials to prevent the contamination of the environment. In particular, the invention is related to rotationally molded salvage drums and lids produced from polyethylene.

2. Description of the Prior Art

Rotationally molded polyethylene salvage drums, or over-pack containers, adapted to contain standard industrial chemical drums are known in the art. An essentially straight-sided, rotationally molded cylindrical polyethylene container adapted to accommodate a 55 gallon industrial drum, to which a flat circular cover can be secured by heat welding, has been used to demonstrate the feasibility of permanently encapsulating the contents for storage. This configuration is not adapted to the use of conventional closure devices, and requires special equipment and handling techniques to seal the cover to the over-pack container, and can not be opened or reused.

A commercially available rotationally molded polyethylene salvage drum has been produced which has a cylindrical sidewall that is tapered inwardly to form a neck portion that extended upwardly and terminated in an integral outwardly extending flange. A generally flat or contoured cover of essentially the same outside diameter as the drum flange is adapted to be secured to the drum by a variety of conventional means, including a conventional metal ring clamp, or nuts and bolts; alternatively the cover is permanently affixed by spin welding, a process in which the cover is rotated against the drum flange until the frictional effects soften and melt the polyethylene surfaces sufficiently to produce a permanent fluid-tight bond. This configuration, while a significant improvement over the straight-side over-pack container, suffered from certain drawbacks in manufacture and use. The smooth-sided containers were also difficult to move with forklift machines and other drum lifting devices. Under certain impact conditions, the metal ring clamp and gasket sealing could fail and permit leakage of liquid contents. The generally uniform diameter of the salvage drums did not permit stacking of the empty drums for storage or shipment. Finally, the flat or single thickness top was subject to deflection upon severe impacts.

SUMMARY OF THE INVENTION

It is therefore a purpose of this invention to provide an over-pack container, or salvage drum, and lid which is reuseable, and which can be securely sealed to withstand severe abuse and impacts without leaking.

It is also an object of this invention to provide a salvage drum which can be securely sealed using a conventional metal drum ring.

It is a further object of this invention to provide a salvage drum of a configuration which can be nested to reduce transportation and storage volumes, and which also is adapted to be moved by the various industrial and commercial drum handling devices and appliances.

The above and other benefits and advantages are attained in accordance with the present invention by providing a one-piece, seamless polyethylene rotationally molded salvage drum adapted to receive an integrally reinforced double-walled plug, or recessed lid which drum and lid when in the mated configuration are adapted to be secured by a conventional metal ring clamp.

The double-walled recessed lid is of substantially the same diameter as the projecting drum rim and is provided with a circumferential reinforcing bead which, with the drum rim, is adapted to be secured by a conventional metal ring clamp.

In a preferred embodiment, the diameter of the lower section of the salvage drum is less than the diameter of the upper section, and the empty uncovered salvage drums can be stacked in a nested configuration.

In a further preferred embodiment, the upper and lower drum walls are provided with projecting vertical column ribs for additional sidewall strength and to facilitate separation of stacked nested units.

The inside of the bottom of the polyethylene drum is preferably provided with a raised annular section of an outside diameter slightly smaller than the diameter of the bottom rim of the standard steel drum that the over-pack container is designed to accommodate. This raised annular section is adapted to maintain the steel drum centered and to prevent its shifting during transportation.

The top of the molded double-walled lid is preferably provided with four raised quarter-circular annular sections that are adapted to mate with the annular recess on the outside bottom of the salvage drum. The lower side of the cap is provided with a plurality of radial inwardly disposed reinforcing ribs which extend from the axial center of the lid and terminate proximate the vertical sidewall of the lid.

BRIEF DESCRIPTION OF THE DRAWINGS

In the accompanying drawings:

FIG. 1B is a half-sectional view of the upper portion of the drum taken along line B—B.

FIG. 1C is a half-sectional view of the lower portion of the drum taken along line C—C.

FIG. 2 is a plan view of the bottom of the double-walled lid.

FIG. 2A is a sectional view of one of the inwardly disposed reinforcing ribs taken along line A—A.

DETAILED DESCRIPTION OF THE PREFERRED EMBODIMENT

Figure 1:
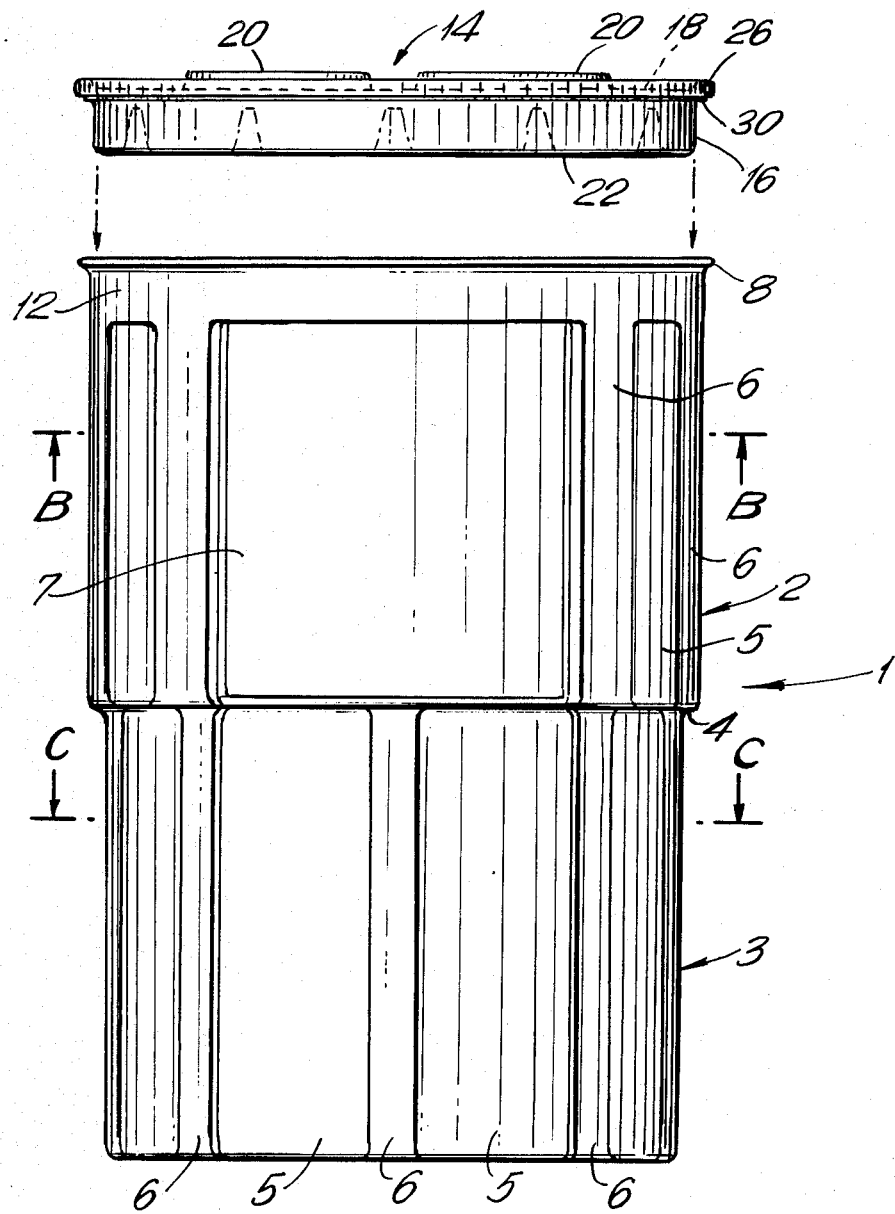
FIG. 1 is a side elevational view of an improved salvage drum in accordance with the present invention.

The present invention is illustrated in the accompanying drawings where the same elements bear identical reference numerals in the different views. As shown in FIG. 1 in which the improved salvage drum is referred to generally as 1, the upper section 2 is of a larger diameter than the lower section 3 to permit nesting of the empty containers during storage and shipment. Middle nesting rib 4 will contact drum rim 8 during stacking. Drum 1 has generally cylindrical sidewalls 5 and is provided with a plurality of vertical column ribs 6 in both upper and lower sections 2 and 3. The configuration of these ribs 6 are shown in FIGS. 1B and 1C, respectively. The upper section is preferably provided with a raised label plate 7 on one or both sides to provide a surface to affix a paper label, or the like, to the polyethylene drum. In the embodiment of FIG. 1, the vertical column ribs terminate at rim reinforcing section 12. The vertical column ribs, in addition to providing strength to the sidewalls, also facilitate the removal of nested drums by reducing the surface area of contact between the drums.

The width of the vertical column ribs can range from one to four inches, or from about 10% to about 25% of the total surface area of the exterior of the drum. On an 85 gallon drum, ribs approximately two inches wide on the lower section and three inches wide on the upper section are satisfactory. In a salvage drum approximately forty inches high, a label plate of approximately sixteen inches on a side can be provided, to leave a rim reinforcing section 12 of about four inches.

The number and dimensions of the vertical column ribs is not critical; in the embodiment of FIG. 1, a total of eight ribs is provided in the lower section 3. Ribs 6 can vary from one-half to one inch in depth, depending on the size of the overpack container, which in turn is determined by the size of the steel drum to be placed inside. Typically, an 85 gallon salvage drum is used to contain a 55 gallon steel drum, and sidewalls of one-eighth to five-eighths of an inch in thickness, with upper section ribs about three-fourths of an inch and lower section ribs of about five-eighths of an inch deep are satisfactory.

The drums can be rotationally molded from linear high or low density, or cross-linked polyethylene using equipment known to those familiar with the art.

Figure 4:
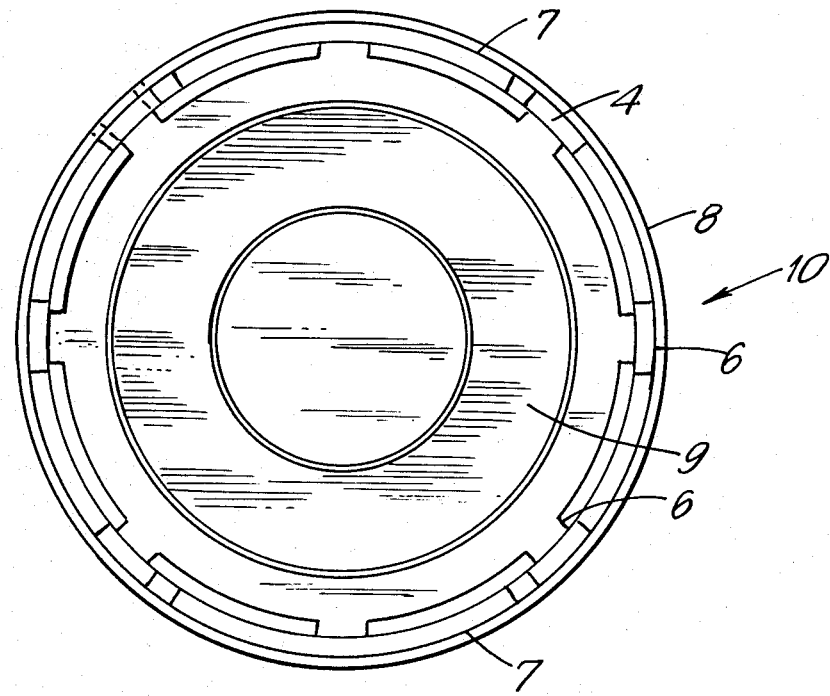
FIG. 4 is a plan view of the bottom of the drum.

As shown in FIG. 4, the bottom 10 of the drum is provided with an annular recess 9, which, as explained below, serves to stabilize the stacked units fitted with lids.

Figure 3:
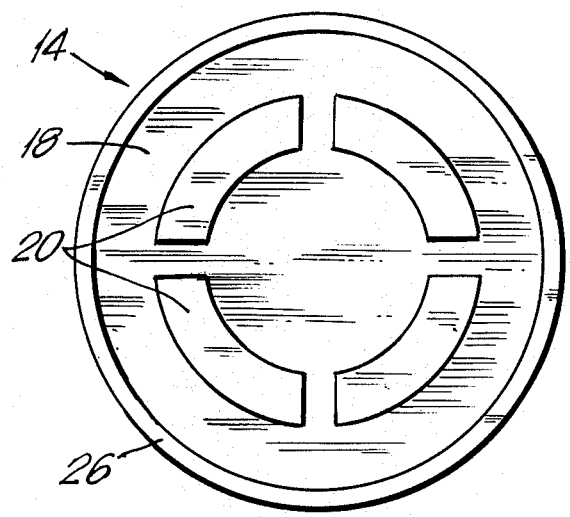
FIG. 3 is a plan view of the top of the double-walled lid.
Figure 6:
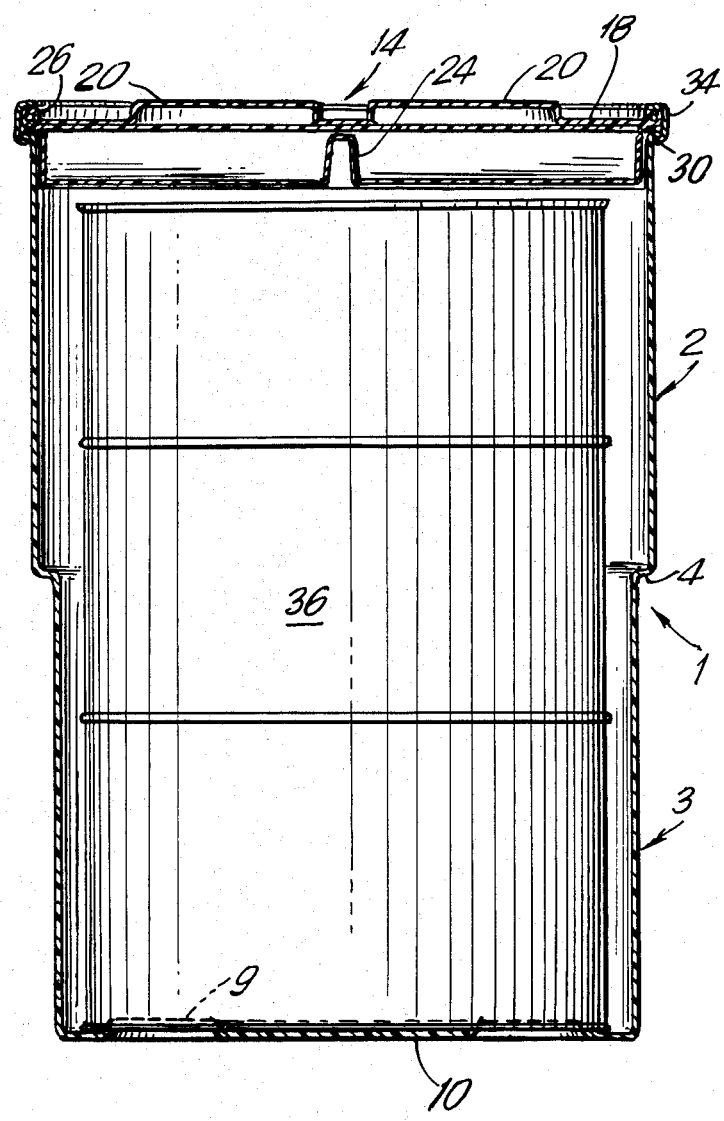
FIG. 6 is a side elevational view, partly in section showing a steel drum in position in a sealed over-pack container of this invention.
Figure 7:
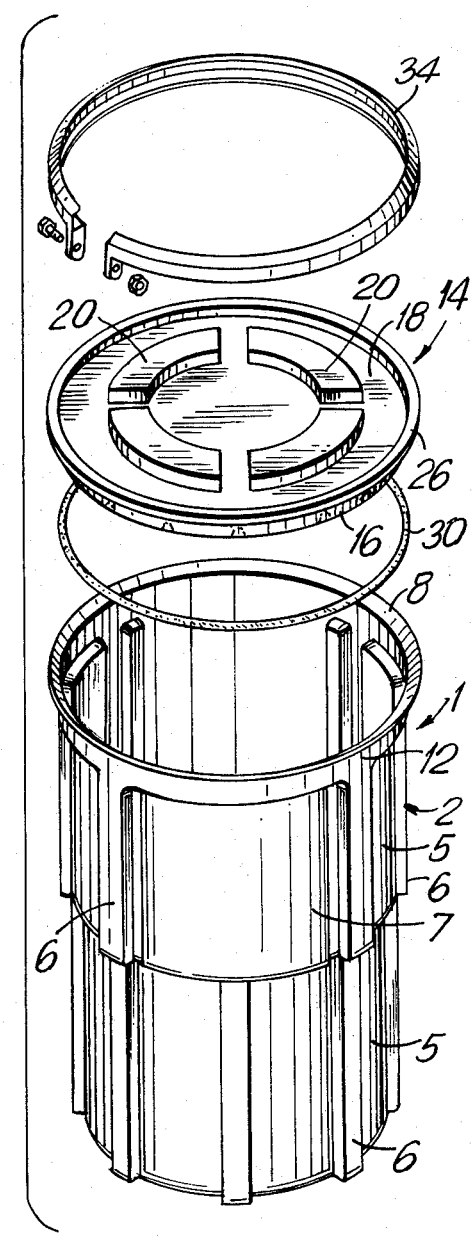
FIG. 7 is an exploded perspective view of the drum and double-walled lid of this invention.

As shown in FIGS. 1 and 6, lid 14 is adapted to fit down inside of drum 1. Recessed lid 14 is rotationally molded polyethylene of one piece construction. The upper surface 18 terminates in circumferential reinforcing bead 26 that is adapted to be secured by a conventional steel ring clamp. The upper surface of the lid is preferably provided with a raised annular section 20, which in the especially preferred embodiment, as best shown in FIG. 3, are quarter circular annular sections adapted to mate with a corresponding annular recess 9 on the bottom 10 of drum 1.

As shown in FIG. 2, the lid lower surface 22 is provided with a plurality of radial inwardly disposed reinforcing ribs 24 which extend from the axial center of the lid and terminate proximate the vertical sidewall 16. The cross-sectional view of FIG. 2A shows one embodiment where the rib is generally trapezoidal. The size and configuration of the radial ribs is not critical and can be determined by those of ordinary skill in the art with reference to the dimensions of the lid and the requirements of the rotational molding process.

Figure 5:
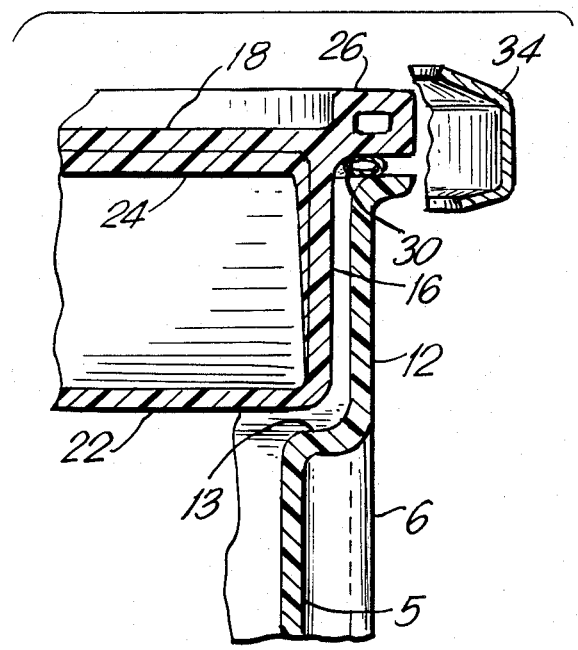
FIG. 5 is a enlarged fragmentary view illustrating the relative positions of the double-walled lid, drum rim, gasket and ring clamp preparatory to sealing.

As shown most clearly in FIG. 5, the circumferential reinforcing bead 26 and the drum rim 8 are adapted to be secured by a conventional steel ring clamp. An O-ring sealing gasket 30 having a rating in the range of 30 to 80 Durometer is put in place on the vertical sidewall 16 below bead 26 to insure a fluid-tight seal. In a preferred embodiment, as illustrated in FIG. 5, the depth of the drum rim reinforcing section 12 corresponds to that of the lid vertical sidewall 16 so that internal supporting shoulder 13 is provided adjacent lower lid surface 22. Shoulder 13 will provide additional support to lid 14 in the event of a severe impact on the upper surface of the lid. As shown in FIG. 5, the inner surface of reinforcing rib 24 is proximate, and preferably in touching alignment with the underside of lid upper surface 18. Thus, in addition to providing resistance to flexing and bending of the lower surface 22, the ribs 24 provide physical support to the upper surface 18 to help withstand severe impacts and dead loads.

As shown in FIG. 6, when industrial drum 36 is in position, annular section 9 engages the bottom of the drum preventing the metal rim from shifting and damaging the polyethylene interior. The recessed lid 14 is proximate the top of the steel drum and prevents it from tipping or moving vertically inside the sealed container. With upper section 2 approximately one and one-half inches larger in diameter than lower salvage drum section 3, the insertion of absorption material to contain liquid leaking from a damaged steel drum is facilitated. When lid 14 and sealing gasket 30 are secured to the drum by steel ring clamp 34 the unit is able to withstand drop tests more severe than any conditions likely to be encountered in industrial or waste clean-up situations.

What is claimed is:

1. In a rotationally molded polyethylene salvage drum having generally cylindrical sidewall and a lid, the improvement which comprises:
    a plurality of spaced apart vertical column ribs radially disposed from said sidewall,
    an outwardly projecting rim at the open end of the drum, and
    a double walled recessed lid with a circumferential reinforcing bead,
    wherein said reinforcing bead and said projecting rim are adapted to be secured by a ring clamp to seal the drum.

2. The salvage drum of claim 1 where the lid is provided with reinforcing ribs.

3. The salvage drum of claim 2 where the lid reinforcing ribs are radial and inwardly disposed.

4. The salvage drum of claim 3 where the reinforcing ribs terminate proximate the underside of the lid.

5. The salvage drum of claim 1 where the outside diameter of the lower section of the salvage drum is smaller than the inside diameter of the upper section of the salvage drum.

6. The salvage drum of claim 5 where the lower and upper sections are approximately of equal height.

7. The salvage drum of claim 1 where the surface area of the vertical column ribs comprises from about 10% to about 25% of the exterior surface area of the drum.

8. The salvage drum of claim 1 where the vertical column ribs terminate at a position below the projecting rim that is proximate the underside of the recessed lid.

9. The improved salvage drum of claim 1 which further comprises an O-ring sealing gasket.

10. The improved salvage drum of claim 1 where the exterior bottom of the drum is provided with a recessed annular section and the lid is provided with a raised annular section adapted to mate with the bottom recess when the sealed units are stacked.

11. The improved salvage drum of claim 10 where the lid is provided with raised quarter annular sections.

12. The improved salvage drum of claim 2 where the inwardly disposed reinforcing ribs are generally trapezoidal.

13. The improved salvage drum of claim 1 where the lid is defined by upper and lower surfaces joined by a vertical sidewall and the vertical sidewall is adapted to fit closely within the open end of the drum.

14. The improved salvage drum of claim 1 where the lid reinforcing bead and the drum rim are of substantially the same diameter.

15. The improved salvage drum of claim 10 where the interior bottom surface of the salvage drum is provided with a raised annular section adapted to engage the rim of a metal drum that is to be contained.

16. The improved salvage drum of claim 1 where the double walled recessed lid when sealed is adapted to prevent a contained steel drum from tipping and shifting during rough handling.

17. The improved salvage drum of claim 5 which comprises at least one label plate in the upper section of the drum.

18. A rotationally molded polyethylene salvage drum comprising generally cylindrical sidewalls interrupted by a plurality of spaced apart outwardly projecting vertical column ribs, the drum having an upper section and a lower section wherein the outside diameter of the lower section is smaller that the inside diameter of the upper section, the open end of the drum terminating in an outwardly projecting rim, and a double walled recessed lid adapted to close the open end of the drum, where the upper surface of the lid terminates in a circumferential reinforcing bead, and said projecting drum rim and lid reinforcing bead when brought into touching alignment are adapted to be secured with a ring clamp.

* * * * *